US010393316B2

(12) United States Patent
Oh et al.

(10) Patent No.: US 10,393,316 B2
(45) Date of Patent: Aug. 27, 2019

(54) DEVICE FOR CHECKING LEAKAGE OF LIVE STEAM FROM STEAM TRAP

(71) Applicants: Soon Ung Oh, Seoul (KR); Geug Tae Kim, Daejeon (KR)

(72) Inventors: Soon Ung Oh, Seoul (KR); Geug Tae Kim, Daejeon (KR)

( * ) Notice: Subject to any disclaimer, the term of this patent is extended or adjusted under 35 U.S.C. 154(b) by 171 days.

(21) Appl. No.: 15/510,604

(22) PCT Filed: Sep. 11, 2015

(86) PCT No.: PCT/KR2015/009594
§ 371 (c)(1),
(2) Date: Mar. 10, 2017

(87) PCT Pub. No.: WO2016/039591
PCT Pub. Date: Mar. 17, 2016

(65) Prior Publication Data
US 2017/0191617 A1 Jul. 6, 2017

(30) Foreign Application Priority Data
Sep. 11, 2014 (KR) ........................ 10-2014-0120017

(51) Int. Cl.
*F16T 1/48* (2006.01)
*G01K 13/02* (2006.01)
*G01M 3/04* (2006.01)

(52) U.S. Cl.
CPC ................ *F16T 1/48* (2013.01); *G01K 13/02* (2013.01); *G01M 3/04* (2013.01); *G01K 2013/024* (2013.01)

(58) Field of Classification Search
CPC ..... F16T 1/48; G01K 13/02; G01K 2013/024; G01M 3/04
USPC .......................................................... 73/40.7
See application file for complete search history.

(56) References Cited

U.S. PATENT DOCUMENTS 4,305,548 A * 12/1981 Miner ....................... G01F 1/74 237/67
4,468,962 A * 9/1984 Keech ..................... G01F 15/08 73/200
4,888,978 A * 12/1989 Yumoto .................... F16T 1/48 73/40

(Continued)

*Primary Examiner* — Marrit Eyassu
(74) *Attorney, Agent, or Firm* — Mathew D. Thayne; Thayne and Davis LLC

(57) ABSTRACT

Devices for checking a leakage of steam from a steam trap. In some embodiments, the device may comprise a body having an inlet end portion connected to the steam trap and an outlet end portion. The device may allow condensate water of the steam trap to flow in through the inlet end portion so as to be discharged through the outlet end portion. The device may further comprise a truncated pyramid part formed to protrude from the middle of the body so as to communicate with the inside of the body; a first steam-water separating means for separating re-evaporated steam re-evaporated from the condensate water flowing through the body; a second steam-water separating means for separating the re-evaporated steam separated from the water in the first steam-water separating means; and a temperature measuring means for measuring and transmitting the temperature of an upper inside of the truncated pyramid part.

13 Claims, 4 Drawing Sheets

(56) References Cited

U.S. PATENT DOCUMENTS

| | | | | | |
|---|---|---|---|---|---|
| 5,992,436 | A * | 11/1999 | Hellman | F16T 1/48 | 137/1 |
| 2002/0124666 | A1* | 9/2002 | Navarro | F16T 1/48 | 73/865.8 |
| 2015/0076241 | A1* | 3/2015 | Zhadanovsky | F01K 17/02 | 237/9 R |

* cited by examiner

DEVICE FOR CHECKING LEAKAGE OF LIVE STEAM FROM STEAM TRAP

TECHNICAL FIELD

The present invention relates to a device for checking a leakage of live steam from a steam trap, and more particularly, to a device for checking a leakage of live steam from a steam trap which is capable of accurately checking whether the live steam leaks from the steam trap.

BACKGROUND ART

In general, during a process of checking a temperature in steam piping, a temperature in the piping may be measured by receiving a signal from an existing temperature sensor and transmitting the signal to an external specific measuring instrument (digital thermometer). In this case, under a predetermined internal pressure, a temperature of condensate water and a temperature of steam are within a range of a saturated temperature.

However, on the assumption that no back pressure is present, the temperature drops to a saturated temperature or lower having atmospheric pressure after the water and the steam pass through a steam trap that is a device for discharging the condensate water. Therefore, the discharged condensate water is changed to re-evaporated steam, such that the temperature is rapidly decreased to a saturated temperature corresponding to pressure at a rear end of the steam trap.

In the related art, there is a device for determining a leakage of live steam from the steam trap, but the device cannot accurately measure the leakage, and as a result, it is difficult to set a reference timing of replacing the steam trap. That is, a temperature may be measured by using an existing infrared temperature measurement device or the like, but in this case, because the temperature is just measured by detecting heat outside the piping, an error range is large, and as a result, it is impossible to exactly determine a degree to which the live steam leaks.

As literature in the related art, there is Korean Patent No. 10-1990-005660 (entitled "Device for Measuring Leakage of Steam from Steam Trap").

DISCLOSURE

Technical Problem

An object of the present invention is to provide a device for checking a leakage of live steam from a steam trap which is capable of accurately checking whether the live steam leaks from the steam trap.

Technical problems to be solved by the present invention are not limited to the aforementioned technical problem, and other technical problems, which are not mentioned above, may be clearly understood from the following descriptions by those skilled in the art to which the present invention pertains.

Technical Solution

To achieve the above object, the present invention provides a device for checking a leakage of live steam from a steam trap, the device including: a body which has a pipe shape having an inlet end portion connected to the steam trap and an outlet end portion opposite to the inlet end portion, allows condensate water from the steam trap to flow into the inlet end portion, and discharges the condensate water to the outlet end portion; a truncated pyramid part which has a hollow structure, protrudes from a middle portion of the body, and communicates with an interior of the body; a first steam-water separating means which is formed on an inner surface of the body, and separates re-evaporated steam re-evaporated from the condensate water flowing along the body; a second steam-water separating means which is formed on an inner surface of the truncated pyramid part, and separates re-evaporated steam which is separated by the first steam-water separating means and flows upward to an upper side of the truncated pyramid part; and a temperature measuring means which is installed at the upper side of the truncated pyramid part so as to be positioned in the truncated pyramid part, and checks whether the live steam leaks from the steam trap by measuring a temperature in an interior of the upper side of the truncated pyramid part and transmitting the temperature.

More specifically, a gas discharge means may be further installed on the truncated pyramid part. The gas discharge means may be an air vent. The upper side of the truncated pyramid part may be opened, a cap member may be installed at the opened upper side of the truncated pyramid part so as to be opened and closed, and the temperature measuring means may be installed on the cap member and positioned in the interior of the upper side of the truncated pyramid part.

The first steam-water separating means may include: a first protrusion which protrudes downward from an upper side of an inner surface of the body so as to be disposed adjacent to the inlet end portion, and induces steam-water separation of the re-evaporated steam from the condensate water; a second protrusion which protrudes upward from a lower side of the inner surface of the body at a distance from the first protrusion toward the outlet end portion, and separates the re-evaporated steam from the condensate water; a third protrusion which protrudes downward from a portion, where the inner surface of the body and an inner surface of the truncated pyramid part abut each other, at a distance from the second protrusion toward the outlet end portion, and separates the re-evaporated steam from the condensate water; and a fourth protrusion which protrudes upward from the lower side of the inner surface of the body so as to be adjacent to the outlet end portion at a distance from the third protrusion, and separates the re-evaporated steam from the condensate water.

Condensate water flow holes may be further formed in the second protrusion and the fourth protrusion, respectively.

A pair of fifth protrusions may protrude upward from the lower side of the inner surface of the body between the first protrusion and the second protrusion at a distance from each other in parallel laterally so as not to block the condensate water flow hole of the second protrusion.

A pair of sixth protrusions may protrude upward from the lower side of the inner surface of the body between the second protrusion and the fourth protrusion at a distance from each other in parallel laterally so as not to block the condensate water flow hole of the fourth protrusion.

The second protrusion may obliquely protrude toward the inlet end portion. The third protrusion may obliquely protrude toward the outlet end portion.

One or more seventh protrusions may protrude downward from the upper side of the inner surface of the body between the first protrusion and the third protrusion.

The second steam-water separating means may be formed in the form of a spiral protrusion that protrudes along a length of the truncated pyramid part.

The second steam-water separating means may be formed in the form of a plate-shaped protrusion and may protrude in a zigzag pattern along a length of the truncated pyramid part.

The second steam-water separating means may obliquely protrude downward.

Advantageous Effects

It is difficult to measure an exact temperature in the case of live steam mixed with condensate water, but according to the present invention, it is possible to accurately measure only a temperature of the live steam because the live steam and the condensate water are separated from each other, and as a result, it is possible to effectively check whether the live steam leaks from the steam trap.

The steam trap in the related art requires accompanying steam in order to discharge the condensate water, and a leak of the live steam occurs in accordance with a degree of abrasion occurring during the use of steam trap after installing the steam trap, but a temperature is just measured by using an infrared detector disposed outside the piping or a contact thermometer disposed outside the piping, and as a result, accuracy inevitably deteriorates when determining a timing of replacing the steam trap. Therefore, many mistakes are made when determining a timing of replacing the steam trap, and as a result, a large amount of live steam leaks, which causes heavy losses. According to the present invention, it is possible to easily recognize whether the live steam leaks because a temperature of the interior of the piping may be accurately measured, and it is possible to greatly reduce an economic loss caused by a leak of the live steam because a reference timing of replacing the steam trap may be determined based on the temperature measurement.

In addition, according to the present invention, in a case in which a condensate water flow meter is installed upstream, it is possible to measure the amount of generated condensate water after checking that no live steam leaks based on the temperature measurement, thereby enabling the development on an adjustable steam trap.

MODES OF THE INVENTION

Figure 1:
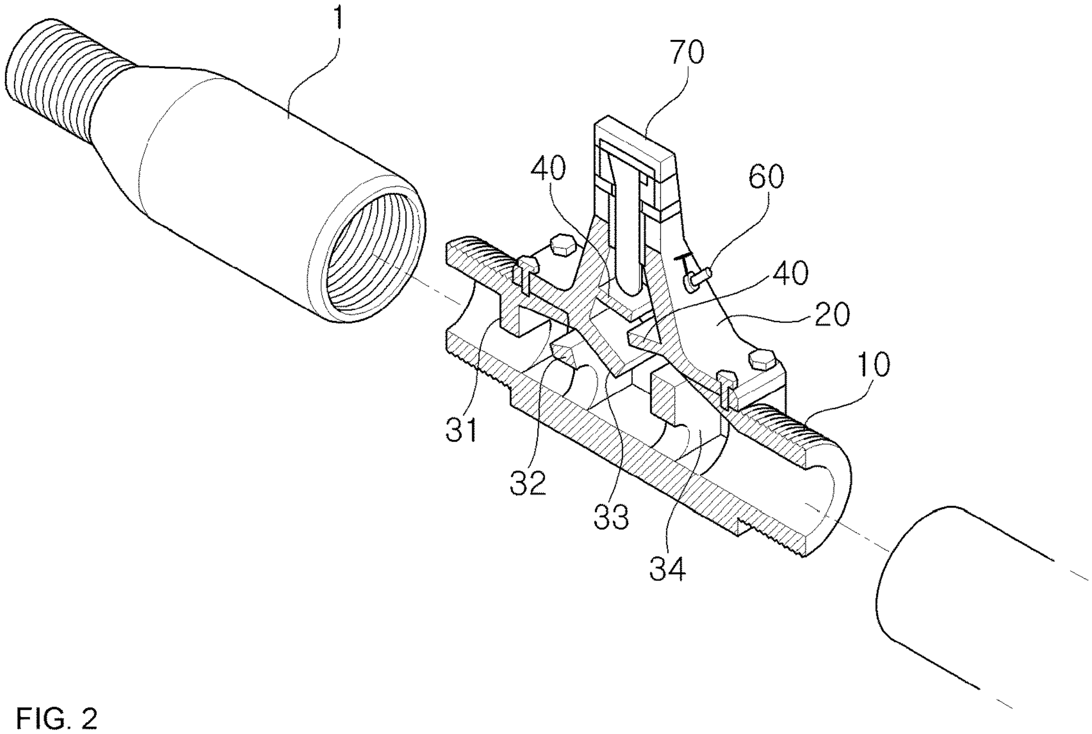
FIG. 1 is a view illustrating a partial cross section of a device for checking a leakage of live steam from a steam trap of the present invention which is connected to the steam trap.

Hereinafter, an exemplary embodiment of the present invention will be described in detail with reference to the accompanying drawings. The same constituent elements will be designated by the same reference numerals at any portion in the drawings, if possible. In addition, detailed descriptions of publicly known functions and configurations will be omitted so as to avoid unnecessarily obscuring the subject matter of the present invention.

Figure 2:
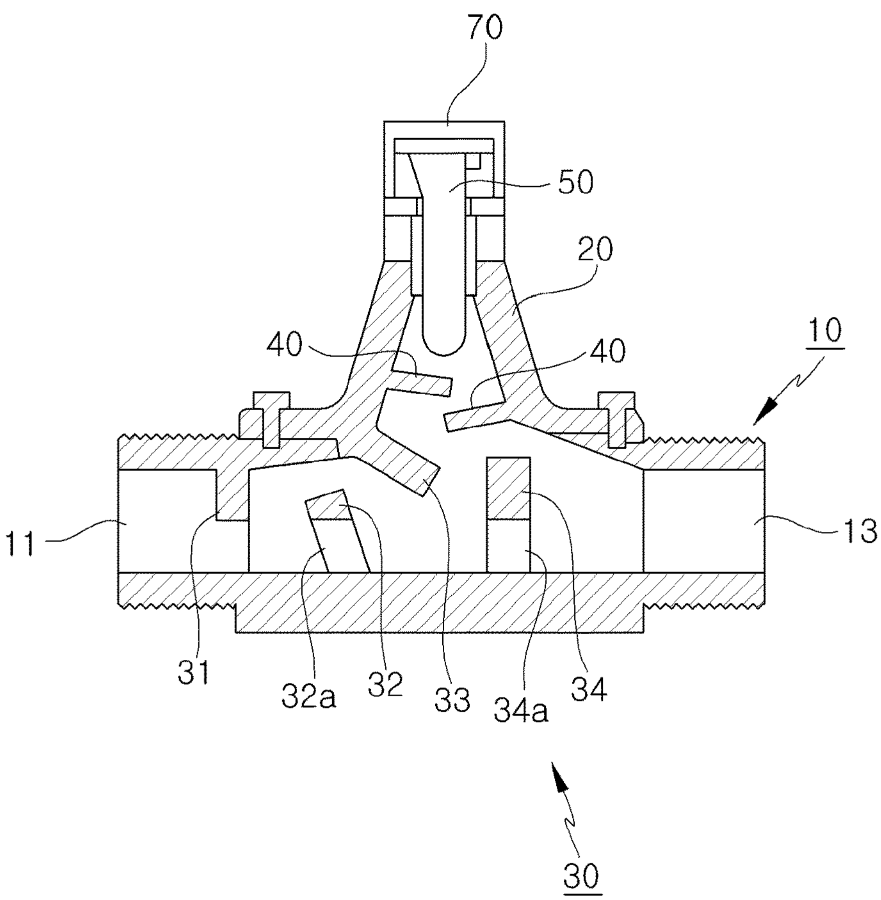
FIG. 2 is a cross-sectional view of the device for checking a leakage of live steam from the steam trap of the present invention.
Figure 3:
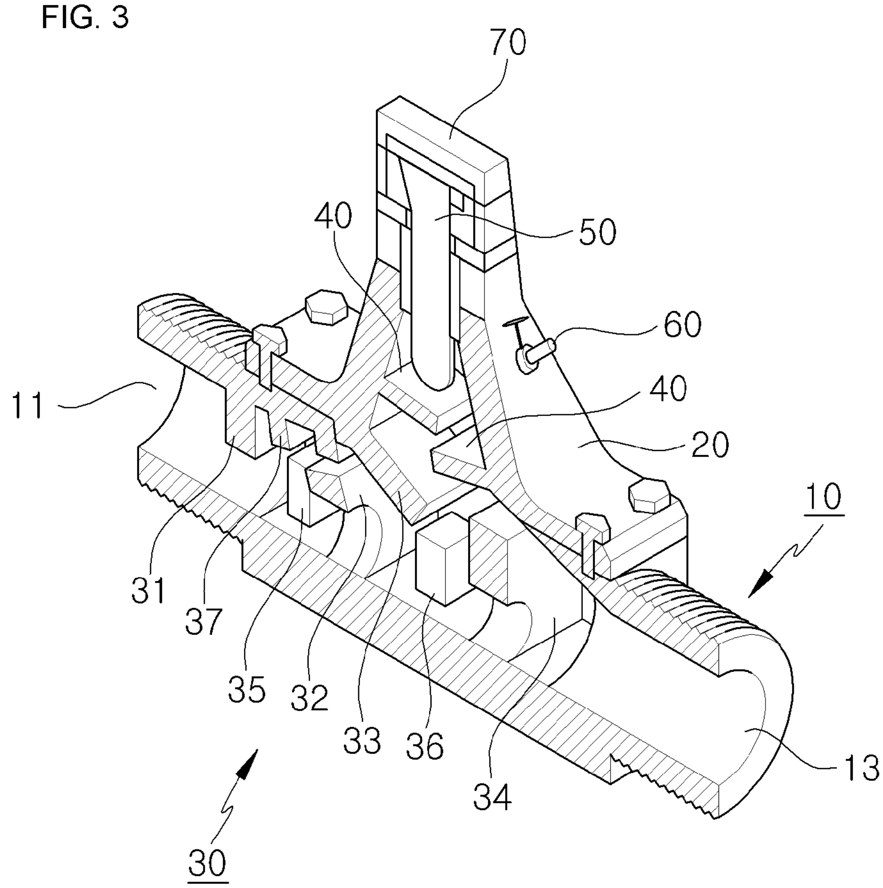
FIG. 3 is a view illustrating a modified embodiment of the device for checking a leakage of live steam from the steam trap of the present invention.
Figure 4:
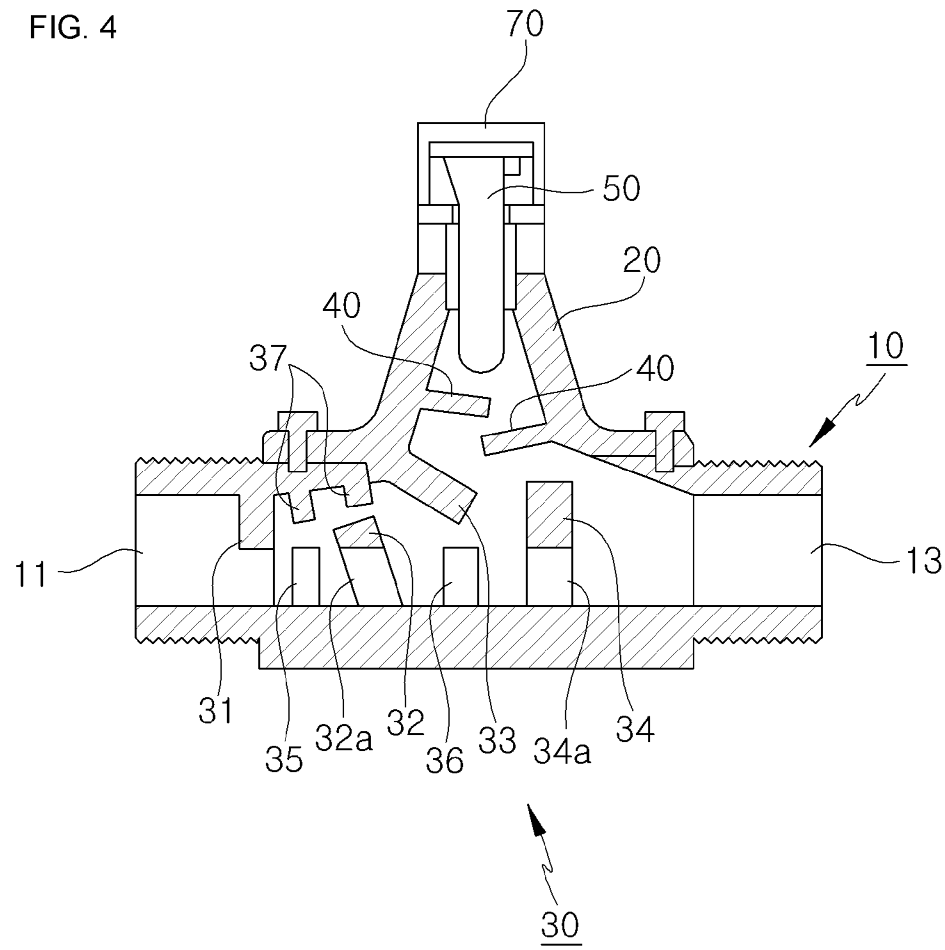
FIG. 4 is a cross-sectional view of a modified embodiment of the device for checking a leakage of live steam from the steam trap of the present invention.
Figure 5:
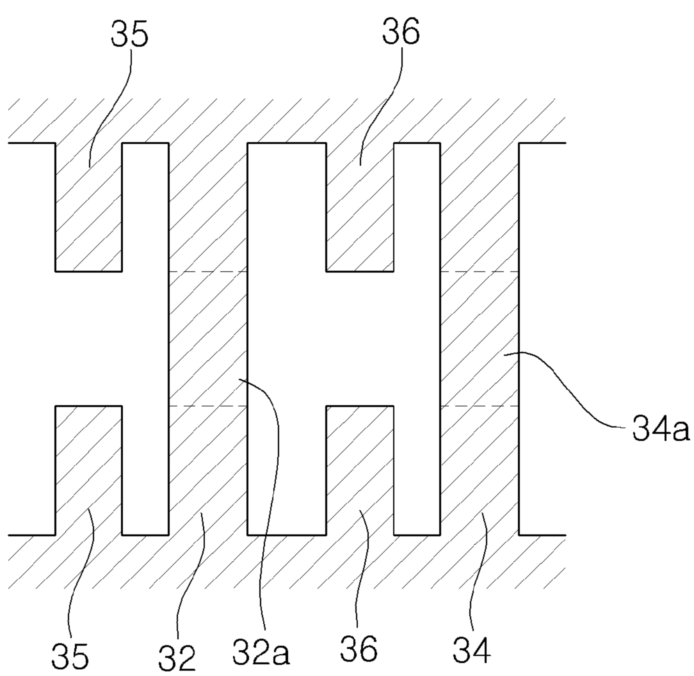
FIG. 5 is a view schematically illustrating a part of an interior of FIG. 3 in a plan view.
Figure 6:
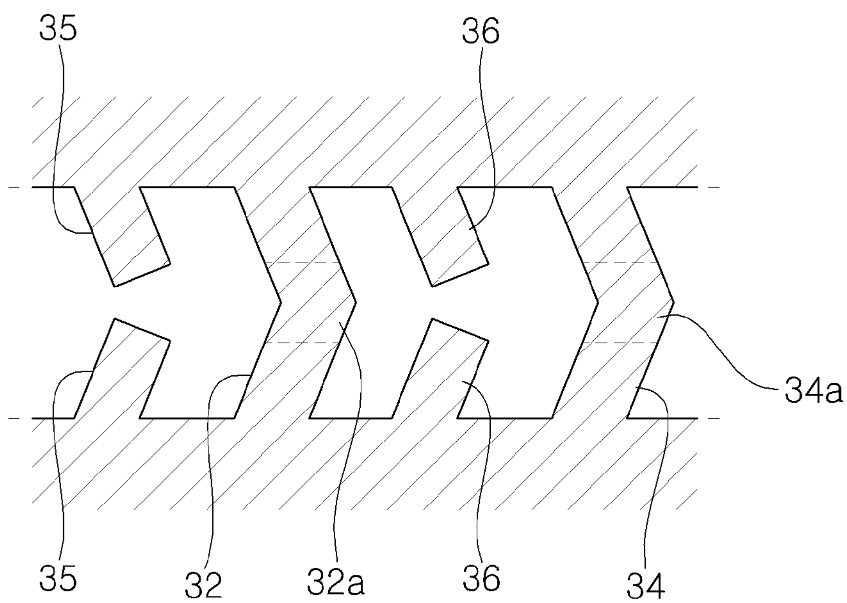
FIG. 6 is a modified embodiment of FIG. 5.

As illustrated in FIGS. 1 and 2, a device for checking a leakage of live steam from a steam trap of the present invention includes a body 10 connected to a steam trap 1. An orifice steam trap is exemplified as an example of the steam trap 1. The body 10 has a pipe shape having an inlet end portion 11 connected to the steam trap 1, and an outlet end portion 13 opposite to the inlet end portion 11, and condensate water flows into the inlet end portion 11 from the steam trap 1, and the condensate water is discharged through the outlet end portion 13.

A truncated pyramid part 20 protrudes perpendicular to an upper middle portion of the body 10. The truncated pyramid part 20 has a hollow structure and communicates with the body 10. The truncated pyramid part 20 may be formed in the form of a frustum of pyramid or a truncated cone. The truncated pyramid part 20 may be detachably coupled to the body 10 in a bolt-fastening manner as illustrated in the drawings, or may be manufactured integrally with the body 10.

A first steam-water separating means 30 is formed on an inner surface of the body 10, and a second steam-water separating means 40 is formed on an inner surface of the truncated pyramid part 20. The first steam-water separating means 30 separates re-evaporated steam re-evaporated from the condensate water which is introduced through the inlet end portion 11 from the steam trap 1 and flows along the body 10, the second steam-water separating means 40 separates re-evaporated steam which is separated by the first steam-water separating means 30 and flows upward toward an upper side of the truncated pyramid part 20.

The condensate water is a liquid, and the steam re-evaporated from the condensate water is in the form of a spray in a water molecular state, and as a result, the condensate water and the re-evaporated steam are liquefied while passing through the first steam-water separating means 30 and the second steam-water separating means 40, and then discharged to the outside through the outlet end portion 13 of the body 10. Because the entirety of the re-evaporated steam is liquefied by the first steam-water separating means 30 and the second steam-water separating means 40, the re-evaporated steam cannot flow upward to the upper side of the truncated pyramid part 20.

Because the live steam, which leaks due to abrasion or the like of the steam trap 1, is in a gas phase, the live steam is not liquefied, but passes through the first steam-water separating means 30 and the second steam-water separating means 40 as it is. The live steam flows upward to an interior of the upper side of the truncated pyramid part 20.

A temperature measuring means 50, which is positioned in the interior of the upper side of the truncated pyramid part 20, is installed at the upper side of the truncated pyramid part 20. The temperature measuring means 50 measures a temperature in the interior of the upper side of the truncated pyramid part 20 and transmits the temperature to the outside, thereby checking whether the live steam leaks from the steam trap 1. The temperature measuring means 50 may be a well-known temperature sensor. Data of temperatures measured by the temperature measuring means 50 are indicated by numbers, graphs, or the like on a temperature display device positioned at a place remote from the steam trap 1.

When the live steam leaks from the steam trap 1, a temperature in the interior of the upper side of the truncated pyramid part 20 is rapidly increased, and the temperature measuring means 50 transmits the change in temperature to the temperature display device in order to indicate the change at the outside, and as a result, whether the live steam leaks from the steam trap 1 may be very accurately and effectively checked at a remote place.

A gas discharge means 60 is installed at the upper side of the truncated pyramid part 20. The gas discharge means 60 may be an air vent which is opened and closed by an operation of a valve. The gas discharge means 60 allows the leaking live steam to quickly flow upward to the interior of the upper side of the truncated pyramid part 20 by continuously discharging air and live steam in the interior of the upper side of the truncated pyramid part 20, thereby enabling the temperature measuring means 50 to accurately measure a temperature of the live steam.

In addition, the gas discharge means 60 prevents the live steam from being condensed in the interior of the upper side of the truncated pyramid part 20 due to heat radiation to the outside, and as a result, the gas discharge means 60 allows the live steam leaking from the steam trap 1 to continuously flow upward to the interior of the upper side of the truncated pyramid part 20, thereby enabling the temperature measuring means 50 to accurately measure a temperature of the live steam.

That is, if the live steam is saturated in the interior of the upper side of the truncated pyramid part 20, new live steam leaking from the steam trap 1 may not flow upward to the interior of the upper side of the truncated pyramid part 20. The gas discharge means 60 discharges the live steam existing in the interior of the upper side of the truncated pyramid part 20, and thus enables the live steam, which is continuously discharged, to continuously flow upward to the interior of the upper side of the truncated pyramid part 20.

A constant temperature of the live steam leaking from the steam trap 1 is maintained to some extent before the live steam is affected by a change in pressure at a downstream side of the steam trap 1, that is, before condensation and re-evaporation occur, and a temperature in this state, that is, a temperature of the leaking live steam is measured, such that whether the live steam leaks may be very accurately checked. Meanwhile, the upper side of the truncated pyramid part 20 may be opened, a cap member 70 may be installed at the opened upper side of the truncated pyramid part 20 in an airtight manner and may be opened and closed, and the temperature measuring means 50 may be installed on the cap member 70 and may be positioned in the interior of the upper side of the truncated pyramid part 20.

As illustrated in FIGS. 1 and 2, the first steam-water separating means 30 may have first to fourth protrusions 31, 32, 33, and 34 which protrude along a length of the body 10 at a distance from each other, such that the re-evaporated steam collides with wall bodies and thus may be effectively liquefied.

Each of the first to fourth protrusions 31, 32, 33, and 34 protrudes in a quadrangular plate shape and defines the wall body with which the re-evaporated steam collides. The live steam passes over the first to fourth protrusions 31, 32, 33, and 34 as it is without being liquefied even though the live steam collides with the first to fourth protrusions 31, 32, 33, and 34.

The first protrusion 31 protrudes downward from an upper side of an inner surface of the body 10 so as to be disposed adjacent to the inlet end portion 11 of the body 10, and induces the separation of the re-evaporated steam from the condensate water. That is, the first protrusion 31 allows the re-evaporated steam to be liquefied. The second protrusion 32 protrudes upward from a lower side of the inner surface of the body 10 at a distance from the first protrusion 31 toward the outlet end portion 13, and separates the re-evaporated steam from the condensate water. The second protrusion 32 obliquely protrudes toward the inlet end portion 11, and allows the condensate water and the re-evaporated steam to generate a vortex flow in a compartment defined between the second protrusion 32 and the first protrusion 31. The re-evaporated steam in the vortex flow collides with the second protrusion 32, and thus the re-evaporated steam is effectively separated. The second protrusion 32 has a condensate water flow hole 32*a* formed at a lower side at a center thereof, thereby allowing the condensate water and the condensate water separated as a liquid to flow toward the outlet end portion 13.

The third protrusion 33 protrudes downward from a portion, where the inner surface of the body 10 and an inner surface of the truncated pyramid part 20 abut each other, at a distance from the second protrusion 32 toward the outlet end portion 13, and separates the re-evaporated steam, and the fourth protrusion 34 protrudes upward from the lower side of the inner surface of the body 10 so as to be adjacent to the outlet end portion 13 at a distance from the third protrusion 33, and separates the re-evaporated steam. A compartment defined between the fourth protrusion 34 and the second protrusion 32 is larger than the compartment defined between the second protrusion 32 and the first protrusion 31.

The condensate water, which passes through the condensate water flow hole 32*a* of the second protrusion 32, and the re-evaporated steam, which overflows the second protrusion 32, flow into an expanded compartment defined by the fourth protrusion 34, and collide with the fourth protrusion 34, thereby forming a vortex flow. The re-evaporated steam in the vortex flow collides with the fourth protrusion 34 and the third protrusion 33, thereby facilitating the steam-water separation. The third protrusion 33 obliquely protrudes toward the outlet end portion 13, thereby allowing the re-evaporated steam to be effectively separated. The fourth protrusion 34 has a condensate water flow hole 34*a* formed at a lower side at a center thereof, thereby allowing the condensate water and the condensate water separated as a liquid to flow toward the outlet end portion 13.

As illustrated in FIGS. 3 to 6, a pair of fifth protrusions 35 may be formed to be directed upward from the lower side of the inner surface of the body 10 between the first protrusion 31 and the second protrusion 32. The fifth protrusions 35 each have a quadrangular shape, a height of the fifth protrusion 35 may be smaller than a height of the second protrusion 32, and the fifth protrusions 35 may protrude at a distance from each other in parallel laterally so as not to block the condensate water flow hole 32*a* of the second protrusion 32. The fifth protrusions 35 define steam-water separation wall bodies, thereby facilitating the steam-water separation of the re-evaporated steam in the vortex flow.

A pair of sixth protrusions 36 may be formed to be directed upward from the lower side of the inner surface of the body 10 between the second protrusion 32 and the fourth protrusion 34. The sixth protrusions 36 each have a quadrangular shape, a height of the sixth protrusion 36 may be smaller than a height of the second protrusion 32 and a height of the fourth protrusion 34, and the sixth protrusions 36 may protrude at a distance from each other in parallel laterally so as not to block the condensate water flow hole 34*a* of the fourth protrusion 34. The sixth protrusions 36 define steam-water separation wall bodies, thereby facilitating the steam-water separation of the re-evaporated steam in the vortex flow.

One or more seventh protrusions 37 may also protrude to be directed downward from the upper side of the inner surface of the body 10 between the first protrusion 31 and the third protrusion 33. The seventh protrusions 37 define steam-water separation wall bodies, with which the re-evaporated steam, which collides with the second protrusion 32 and forms a vortex flow, and the re-evaporated steam, which overflows the second protrusion 32, collide, thereby facilitating the steam-water separation of the re-evaporated steam.

The second steam-water separating means 40 is formed in the form of a spiral protrusion that protrudes at an inner circumferential edge of the truncated pyramid part 20 along a length of the truncated pyramid part 20, thereby effectively separating the re-evaporated steam that flows upward to the interior of the upper side of the truncated pyramid part 20.

In addition, as illustrated in the drawings, the second steam-water separating means 40 is formed in the form of a plate-shaped protrusion and protrudes in a zigzag pattern along the length of the truncated pyramid part 20, thereby effectively separating the re-evaporated steam that flows upward to the interior of the upper side of the truncated pyramid part 20. The second steam-water separating means 40, which is formed in the form of a plate-shaped protrusion, obliquely protrudes downward, and as a result, it is possible to facilitate the steam-water separation of the re-evaporated steam and to allow the liquefied re-evaporated steam to quickly drop into the compartment defined by the fourth protrusion 34.

The entirety of the re-evaporated steam is liquefied by the first steam-water separating means 30 and the second steam-water separating means 40, and then discharged to the outside without flowing upward to the upper side of the truncated pyramid part 20, and the leaking live steam flows upward to the interior of the upper side of the truncated pyramid part 20 without being affected by the first steam-water separating means 30 and the second steam-water separating means 40, and then is discharged to the outside by the gas discharge means 60. The temperature measuring means 50 measures a temperature of the live steam flowing upward to the interior of the upper side of the truncated pyramid part 20, and transmits the temperature to the temperature display device. The gas discharge means 60 is connected to a gas discharge hose, and as a result, it is possible to prevent the occurrence of a safety accident such as a burn caused by the live steam at a very high temperature.

As described above, according to the present invention, the live steam and the condensate water are separated from each other, and as a result, it is possible to accurately measure only a temperature of the live steam, and thus to effectively check whether the live steam leaks from the steam trap.

According to the present invention, it is possible to easily recognize whether the live steam leaks because a temperature of the interior of the piping may be accurately measured, and it is possible to greatly reduce an economic loss caused by a leak of the live steam because a reference timing of replacing the steam trap may be determined based on the temperature measurement.

The exemplary embodiment of the present invention has been described above, and those skilled in the art to which the present invention pertains can implement exemplary embodiments different from the detailed description of the present invention within the basic technical scope of the present invention. Here, it should be construed that the basic technical scope of the present invention is determined by the claims, and all differences within the equivalent scope thereto are included in the scope of the present invention.

The invention claimed is:

1. A device for checking a leakage of live steam from a steam trap, the device comprising:

- a body which has a pipe shape having an inlet end portion connected to the steam trap and an outlet end portion opposite to the inlet end portion, allows condensate water from the steam trap to flow into the inlet end portion, and discharges the condensate water to the outlet end portion;
- a truncated pyramid part which has a hollow structure, protrudes from a middle portion of the body, and communicates with an interior of the body;
- a first steam-water separating means which is formed on an inner surface of the body, and separates re-evaporated steam re-evaporated from the condensate water flowing along the body, wherein the first steam-water separating means comprises:
  - a first protrusion which protrudes downward from an upper side of an inner surface of the body so as to be disposed adjacent to the inlet end portion, and induces steam-water separation of the re-evaporated steam from the condensate water,
  - a second protrusion which protrudes upward from a lower side of the inner surface of the body at a distance from the first protrusion toward the outlet end portion, and separates the re-evaporated steam from the condensate water,
  - a third protrusion which protrudes downward from a portion, where the inner surface of the body and an inner surface of the truncated pyramid part abut each other, at a distance from the second protrusion toward the outlet end portion, and separates the re-evaporated steam from the condensate water, and
  - a fourth protrusion which protrudes upward from the lower side of the inner surface of the body so as to be adjacent to the outlet end portion at a distance from the third protrusion, and separates the re-evaporated steam from the condensate water;
- a second steam-water separating means which is formed on an inner surface of the truncated pyramid part, and separates re-evaporated steam which is separated by the first steam-water separating means and flows upward to an upper side of the truncated pyramid part; and
- a temperature measuring means which is installed at the upper side of the truncated pyramid part so as to be positioned in the truncated pyramid part, and checks whether the live steam leaks from the steam trap by measuring a temperature in an interior of the upper side of the truncated pyramid part and transmitting the temperature.

2. The device of claim 1, wherein a gas discharge means is further installed on the truncated pyramid part.

3. The device of claim 2, wherein the gas discharge means is an air vent.

4. The device of claim 1, wherein the upper side of the truncated pyramid part is opened, a cap member is installed at the opened upper side of the truncated pyramid part so as to be opened and closed, and the temperature measuring means is installed on the cap member and positioned in the interior of the upper side of the truncated pyramid part.

5. The device of claim 1, wherein condensate water flow holes are further formed in the second protrusion and the fourth protrusion, respectively.

6. The device of claim 5, wherein a pair of fifth protrusions protrudes upward from the lower side of the inner surface of the body between the first protrusion and the second protrusion at a distance from each other in parallel laterally so as not to block the condensate water flow hole of the second protrusion.

7. The device of claim 5, wherein a pair of sixth protrusions protrudes upward from the lower side of the inner surface of the body between the second protrusion and the fourth protrusion at a distance from each other in parallel laterally so as not to block the condensate water flow hole of the fourth protrusion.

8. The device of claim 1, wherein the second protrusion obliquely protrudes toward the inlet end portion.

9. The device of claim 1, wherein the third protrusion obliquely protrudes toward the outlet end portion.

10. The device of claim 1, wherein one or more seventh protrusions protrude downward from the upper side of the inner surface of the body between the first protrusion and the third protrusion.

11. The device of claim 1, wherein the second steam-water separating means is formed in the form of a spiral protrusion that protrudes along a length of the truncated pyramid part.

12. The device of claim 1, wherein the second steam-water separating means is formed in the form of a plate-shaped protrusion and protrudes in a zigzag pattern along a length of the truncated pyramid part.

13. The device of claim 12, wherein the second steam-water separating means obliquely protrudes downward.

* * * * *